United States Patent [19]

Shimizu et al.

[11] Patent Number: 5,073,358
[45] Date of Patent: Dec. 17, 1991

[54] PREPARATION OF SILICON NITRIDE POWDER

[75] Inventors: Mutsuo Shimizu; Hirofumi Fukuoka, both of Annaka; Masanori Fukuhira, Takasaki, all of Japan

[73] Assignee: Shin-Etsu Chemical Co., Ltd., Tokyo, Japan

[21] Appl. No.: 557,572

[22] Filed: Jul. 24, 1990

[30] Foreign Application Priority Data

Jul. 28, 1989 [JP] Japan .................................. 1-195954
Jul. 28, 1989 [JP] Japan .................................. 1-195955

[51] Int. Cl.⁵ .......................................... C01B 21/068
[52] U.S. Cl. ..................................... 423/344; 422/142
[58] Field of Search ....................... 423/344; 501/97; 422/142

[56] References Cited

FOREIGN PATENT DOCUMENTS 61-97110  5/1986  Japan ................................. 423/344

Primary Examiner—Olik Chaudhuri
Assistant Examiner—Ken Horton
Attorney, Agent, or Firm—McAulay Fisher Nissen Goldberg & Kiel

[57] ABSTRACT

Silicon nitride powder is prepared by continuously supplying metallic silicon powder to a first fluidized bed which is composed of silicon nitride powder and a non-oxidizing reaction gas containing nitrogen or ammonia gas and maintained at 1,000° to 1,400° C. where primary nitriding reaction takes place, and continuously withdrawing the nitride product from the first fluidized bed and supplying it to a second fluidized bed of similar composition where secondary nitriding reaction takes place for nitriding the unreacted metallic silicon powder.

7 Claims, 2 Drawing Sheets

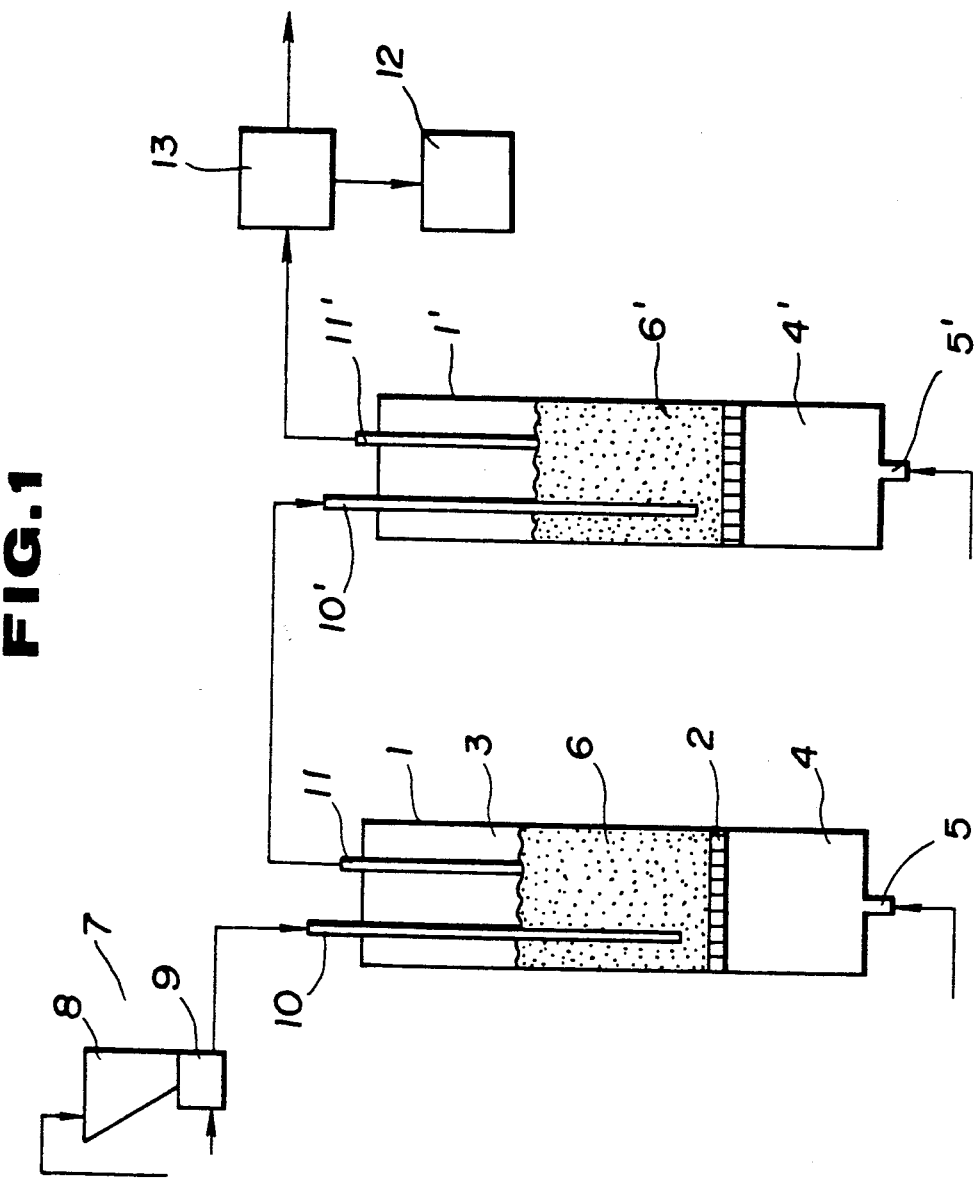

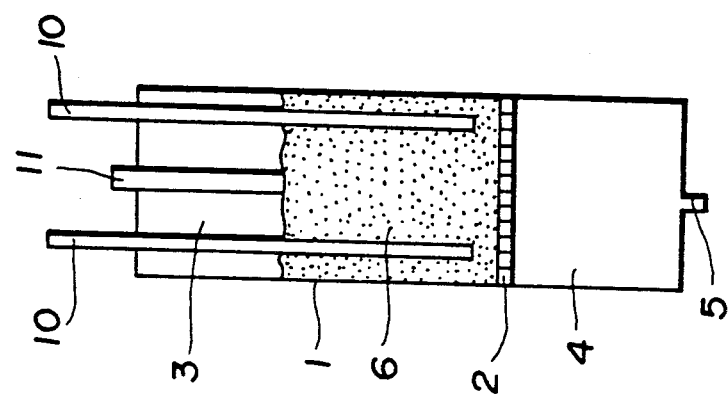
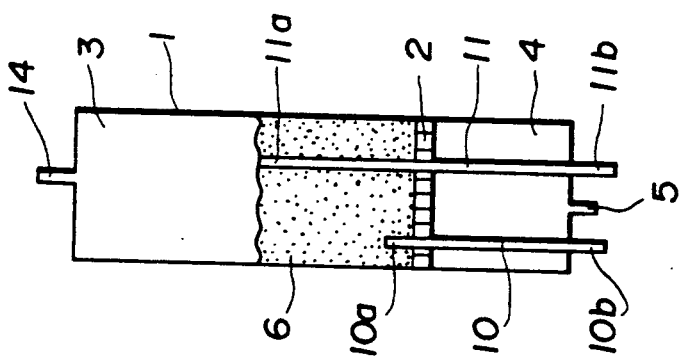

PREPARATION OF SILICON NITRIDE POWDER

This invention relates to the efficient preparation of silicon nitride powder of consistent quality by direct nitriding in a fluidized bed.

BACKGROUND OF THE INVENTION

Most prior art methods for commercially preparing silicon nitride powder by the direct nitriding of metallic silicon powder rely on fixed bed batchwise systems. However, the fixed bed batchwise systems yield silicon nitride powder products of varying quality. Often the percentage of $\alpha$ phase varies from batch to batch. Even a single batch shows local variations in the temperature distribution in the furnace and the progress of nitriding reaction, also resulting in silicon nitride powder of varying quality. Variations in quality of silicon nitride powder become larger as the batch scale is increased. Another problem of the fixed bed batchwise systems is difficulty to automate raw material supply and product withdrawal steps, leaving a risk of contamination. Therefore, scale-up of the fixed bed batchwise system for commercial mass production invites many problems including greater variations in quality of silicon nitride powder products, heavy duty operations, greater labor inputs, and long heating and cooling periods.

A variety of methods have been proposed to address the problems. For example, it is known to use a vertical furnace (see Japanese Patent Application Kokai No. 151311/1983), a pusher type tunnel furnace (see Japanese Patent Application Kokai No. 186406/1985), a rotary kiln (see Japanese Patent Application Kokai No. 266305/1986), and a fluidized bed (see Japanese Patent Application Kokai No. 97110/1986).

However, few such methods can solve the problems of silicon nitride powder quality and production efficiency at the same time. For example, the use of a vertical furnace suffers from substantial variations in furnace temperature distribution and the progress of nitriding reaction, resulting in silicon nitride powder having a largely varying content of $\alpha$ phase. The method using a pusher type tunnel furnace can produce silicon nitride powder having a relatively consistent content of $\alpha$ phase, but in commercially undesirable yields. A rotary kiln is difficult to control the residence time, and so, larger variations occur in $\alpha$ phase content and other quality factors and stable operation is unexpectable. The method using a fluidized bed can produce silicon nitride powder having a relatively consistent content of $\alpha$ phase, but long term furnace heating and cooling cycles and slow nitriding reaction impose some limitation to its commercial production rates.

More particularly, Japanese Patent Application Kokai No. 97110/1986 is directed to the preparation of silicon nitride powder by direct nitriding through a fluidized bed. Alpha phase rich silicon nitride powder is prepared by fluidizing metallic silicon powder with a reaction gas containing nitrogen or ammonia gas while the powder is heated at a controlled rate to prevent melting and agglomeration of silicon nitride powder. Due to batchwise operation, this method requires a long time for heating and cooling, resulting in commercially less desirable production rates.

The continuous preparation of silicon nitride powder by direct nitriding through a fluidized bed reactor has the following problems with respect to supply of metallic silicon powder to the reactor and withdrawal of silicon nitride powder from the reactor.

(i) The metallic silicon powder supplied to the reactor is exposed to high temperatures at which particles agglomerate and fuse so that metallic silicon powder is not constantly available at the reaction zone.

(ii) The metallic silicon powder supplied to the reactor is not uniformly dispersed so that contacting metallic silicon particles agglomerate and fuse together, failing to ensure the stable operation of the reactor and the consistent production of quality silicon nitride powder.

(iii) Silicon nitride powder is typically withdrawn from the reactor through a discharge duct in an overflow mode. As silicon nitride powder adheres to the duct wall, the duct passage becomes narrower and is eventually clogged.

The prior art methods suffer from ambivalence in that production rates are lowered if variations in quality factors like $\alpha$-phase content are minimized to a satisfactory level, while quality control becomes difficult if production rates are increased to a commercially acceptable level.

SUMMARY OF THE INVENTION

Therefore, an object of the present invention is to provide a novel and improved method for preparing silicon nitride powder in high yields with minimized variations in quality factors like $\alpha$-phase content.

According to the present invention, there is provided a method for preparing silicon nitride powder, comprising the steps of:

continuously supplying a feed material containing metallic silicon powder to a first fluidized bed composed of silicon nitride powder and a non-oxidizing reaction gas containing nitrogen or ammonia gas while maintaining the bed at 1,000° to 1,400° C., whereby primary nitriding reaction takes place in the first fluidized bed, continuously withdrawing the nitride product from the first fluidized bed, continuously supplying the nitride product to a second fluidized bed composed of silicon nitride powder and a non. oxidizing reaction gas containing nitrogen or ammonia gas, whereby secondary nitriding reaction takes place in the second fluidized bed for nitriding the unreacted feed material, and continuously withdrawing the nitride product from the second fluidized bed.

Most methods for preparing silicon nitride powder in a Q fluidized bed reaction mode have the problem that since the feed material or metallic silicon powder supplied to the fluidized bed is directly exposed to high temperature atmospheres, metallic silicon particles are immediately melted at their surface, resulting in losses of specific surface area, a lowering of reaction rate, and fusion and agglomeration of particles to hinder formation of a fluidized bed. If the temperature of the fluidized bed is lowered, then a substantial drop of nitriding reaction rate occurs. One solution to this problem is the method of Japanese Patent Application Kokai No. 97110/1986 which intends to heat a fluidized bed composed of metallic silicon powder and a reaction gas at a controlled rate of 30° to 150° C./hour so as to prevent melting and agglomeration of metallic silicon particles, thereby yielding silicon nitride powder of consistent quality. As previously indicated, this method has shortcomings including long heating and cooling cycles, slow nitriding reaction, and commercially less desirable production rates.

In contrast, the method of the present invention is designed such that primary nitriding reaction takes place in a first fluidized bed heated and maintained at a temperature of 1,000° to 1,400° C., preferably 1,200° to 1,350° C., which is below the melting point of metallic silicon, but as high as possible insofar as metallic silicon powder does not experience a substantial drop in specific surface area, whereby nitride is formed on the surface of metallic silicon particles. The nitride product is then delivered to a second fluidized bed where secondary nitriding reaction takes place. If desired, the nitride product is further subjected to tertiary and subsequent nitriding reactions to enhance nitriding. In this way, silicon nitride powder with a high degree of nitriding and of consistent quality is obtained without the problems of particle melting and agglomeration. The sequence of steps of continuously supplying metallic silicon powder to the preheated first fluidized bed, continuously withdrawing the silicon nitride powder resulting from primary nitriding reaction from the first fluidized bed, and continuously supplying the powder to the second fluidized bed eliminates heating and cooling steps, thus allowing production of silicon nitride powder in high yields. The advantage of the fluidized bed reaction mode that particles are vigorously agitated and mixed in the bed so that a substantially complete mixing state is established in the bed ensures that although it is difficult to achieve a high degree of nitriding only with the first fluidized bed, secondary or multiple nitriding reactions lead the final product to a sufficiently high degree of nitriding.

Therefore, the present method can produce silicon nitride powder with minimized quality variations and a high degree of nitriding, in commercially acceptable yields.

According to one preferred embodiment of the present method, a feed material containing metallic silicon powder dispersed and carried by a non-oxidizing gas flow is continuously supplied to the first fluidized bed at its bottom, and the powder silicon nitride product dispersed and carried by the exhaust gases is continuously withdrawn from the first fluidized bed at its top. This insures continuous stable supply of metallic silicon powder, stable nitriding reaction, stable recovery of silicon nitride powder, and hence, continuous production of silicon nitride powder with minimized quality variations in high yields.

BRIEF DESCRIPTION OF THE DRAWINGS

The above and other objects, features, and advantages of the present invention will be better understood from the following description taken in conjunction with the accompanying drawings, in which:

FIG. 1 is a schematic diagram showing a continuous reaction system for implementing the method of the present invention;

FIGS. 2 and 3 are schematic illustrations of different examples of the reactor used in the present method.

Like parts are designated by the same reference numerals throughout the figures.

DESCRIPTION OF THE PREFERRED EMBODIMENTS

According to the present method, silicon nitride powder is prepared by continuously supplying a nitriding feed material containing metallic silicon powder to a plurality of fluidized beds, each of which is composed of silicon nitride powder and a non-oxidizing reaction gas containing nitrogen or ammonia gas and maintained at a predetermined temperature, in a serial flow manner, thereby effecting multiple nitriding reactions stepwise in the fluidized beds.

The metallic silicon powder which is a major component of the feed material is not particularly limited in particle size although an average particle size of 149 $\mu$m to 4 mm is preferred. One exemplary silicon powder which can be used herein is obtained by starting with metallic silicon powder in fine particulate form having a particle size of less than 44 $\mu$m, granulating it to an average particle size of 149 $\mu$m to 4 mm with the aid of a suitable binder such as polyvinyl alcohol, and briefly sintering the resulting granules at 1,100° to 1,300° C. to such an extent that silicon granules are lightly cemented together, but not melted. The feed material may be a mixture of metallic silicon powder and 5 to 50% by weight, preferably 10 to 30% by weight of silicon nitride powder having an average particle size of about 149 $\mu$m to 4 mm. The addition of silicon nitride powder allows the feed material to be fed at an increased rate, and is effective in increasing the average degree of nitriding by the primary nitriding reaction in the first fluidized bed even when the residence time in the bed is reduced and in preventing fusion and agglomeration of metallic silicon particles. Production rates drop if the proportion of silicon nitride powder added exceeds 50% by weight of the mixture whereas less than 5% by weight of silicon nitride powder added provides little effect.

The present method subjects the feed material to multiple nitriding reactions in a plurality of fluidized beds. Each fluidized bed is composed of silicon nitride powder and a non-oxidizing reaction gas containing nitrogen or ammonia gas. It is heated and maintained at a nitriding temperature. More particularly, the first fluidized bed which the feed material enters first is heated and maintained at 1,000° to 1,400° C., preferably 1,200° to 1,350° C. whereby primary nitriding reaction forms a nitride on the surface of metallic silicon particles in the first fluidized bed. Little nitride is formed on the surface of metallic silicon particles if the fluidized bed is at temperatures below 1,000° C., whereas temperatures in excess of 1,400° C. causes particles to melt and agglomerate. The heating temperature of the second and optional subsequent fluidized beds is not particularly limited, but preferably ranges from 1,200° to 1,700° C., more preferably 1,350° to 1,500° C. Preferably the heating temperature of the second bed is higher than that of the first bed, and so forth. That is, the heating temperature of a later stage bed is set higher. The number of fluidized beds or the order of nitriding reactions is preferably two or three from the standpoint of productivity.

The nor-oxidizing reaction gas which assists in forming the fluidized bed is one containing nitrogen or ammonia gas. The reaction gas may further contain hydrogen gas or an inert gas such as argon gas. The proportion of nitrogen or ammonia gas generally ranges from 10 to 100% by volume, preferably from 60 to 90% by volume of the reaction gas.

Better results are obtained by using a carrier gas in supplying the feed material to the first fluidized bed. The metallic silicon powder as the feed material is dispersed and carried by a non-oxidizing gas flow prior to continuous supply to the first fluidized bed at its bottom. Also, the powder silicon nitride product as dispersed and carried by the exhaust gases is continuously withdrawn from the first fluidized bed at its top.

Since the metallic silicon powder as carried on a non-oxidizing gas flow is conveyed to the fluidized bed, metallic silicon particles are dispersed without mutual contact in the gas phase, that is, it is unlikely that particles are held in contact. In addition, the kinetic energy the gas flow velocity imparts to individual particles acts so as to prevent fusion and agglomeration of particles. Such free metallic silicon particles are least prone to fuse and agglomerate together when the particles are introduced into the fluidized bed and passed through a high temperature atmosphere. This allows for stable supply of the feed material to the bed. Since the feed material is injected along with the gas flow into the fluidized bed at its bottom, the feed material is dispersed uniformly and quickly in the fluidized bed. This feature also prevents fusion and agglomeration of metallic silicon particles. Therefore, nitriding reaction proceeds smoothly enough to provide a reaction product (silicon nitride powder) of consistent quality.

Since the reaction product or silicon nitride powder as carried on the exhaust gas flow is taken out of the fluidized bed at its top into a discharge duct, there is no likelihood that the reaction product adheres to the inner wall of the discharge duct to block the duct. The reaction product can be withdrawn and recovered efficiently. Conveyance of the reactant material along with carrier gas is continued to subsequent reactors. As a result, silicon nitride powder of least varying quality can be continuously produced in high rates and yields.

The non-oxidizing gas flow for carrying the nitriding feed material and thereafter the reaction product is preferably selected from nitrogen gas, ammonia gas, argon gas, and hydrogen gas, and passed at a flow velocity of at least 1 m/sec., especially 3 to 10 m/sec. Metallic silicon powder is loaded and dispersed in the carrier gas in an amount of 0.1 to 100 grams/liter, especially 1 to 10 grams/liter (gas volume calculated in normal condition) prior to entry to the fluidized bed.

The average residence time of metallic silicon powder in the fluidized bed generally ranges from 0.1 to 10 hours, preferably 1 to 5 hours. Nitriding reaction does not fully take place within an average residence time of shorter than 0.1 hour whereas longer than 10 hours is not recommended for productivity. The reaction gas is preferably supplied at a linear velocity of 5 to 100 cm/sec., more preferably 20 to 50 cm/sec. A linear velocity of lower than 5 cm/sec. is too slow to provide fluidization whereas higher than 100 cm/sec. causes granules to collide with the reactor wall and with each other to break into finer fragments which disturb steady operation.

Referring to FIG. 1, there is illustrated a continuous reaction system for preparing silicon nitride powder according to the present invention. The system includes a serial flow arrangement of first and second reactors 1 and 1'. The first reactor 1 defines an interior space which is partitioned into an upper reaction chamber 3 and a lower reaction gas supply chamber 4 by a gas dispersion partition 2 having a plurality of through holes for gas injection. The reactor 1 is provided at the bottom wall of the reaction gas supply chamber 4 with an inlet port 5 for introducing a reaction gas containing nitrogen or ammonia gas into the chamber. The reaction gas enters the supply chamber 4 through the inlet port 5, increases its pressure in the supply chamber 4 by continuous gas pumping, and diffuses into the reaction chamber 3 through the holes in the partition 2. In the reaction chamber 3, the dispersing reaction gas forms a fluidized bed 6 with metallic silicon powder.

A mixing feeder means 7 for mixing and dispersing metallic silicon powder as the feed material with a non-oxidizing gas to form a non-oxidizing gas stream having metallic silicon powder loaded therein is provided. The mixing feeder means 7 includes a hopper 8 for storing metallic silicon powder as the feed material and a dispersion mixer 9 for dispensing a predetermined amount of metallic silicon powder from the hopper and dispersing it in a non-oxidizing gas stream. An output of the dispersion mixer 9 is coupled to an input of a supply conduit 10 having an output extended deep in the fluidized bed 6 in the reactor 1. The non-oxidizing gas stream having metallic silicon powder dispersed therein is introduced into the fluidized bed near its bottom from the mixing feeder means 7 through the supply conduit 10.

The reactor 1 is also provided with a discharge conduit 11 for withdrawing the silicon nitride powder formed in the fluidized bed 6 as being entrained on the exhaust gases. An input of the discharge conduit 11 is located near the top of the fluidized bed 6. An output of the discharge conduit 11 is coupled to an input of a second supply conduit 10, for the second reactor 1'. The second reactor 1' is of the same construction as the first reactor 1' and the second supply conduit 10 extends near the bottom and a second discharge conduit 11' extends near the top of a second fluidized bed 6' in the second reactor 1'. An output of the second discharge conduit 11, is coupled to a separator 13 which is coupled to a collector 12. The silicon nitride powder exiting the second reactor 1' along with the exhaust gases is separated from the gases in the separator 13 and recovered in the collector 12. It will be understood that the height of first and second fluidized beds 6 and 6, is determined by the location of the input of the discharge conduits 11 and 11'. The exhaust gases from which the silicon nitride powder has been unloaded by the separator 13 may be fed back to the reaction gas supply chamber 4 or 4' of the first or second reactor 1 or 1'.

The operation of this system for silicon nitride powder production is started by charging the reaction chamber 3 of the first reactor 1 with an initial mass of silicon nitride powder. A reaction gas containing nitrogen or ammonia gas is continuously supplied into the supply chamber 4 through the inlet port 5 whereupon the reaction gas is supplied into the reaction chamber 3 through the dispersing partition 3 in a dispersing manner, creating a fluidized bed composed of the reaction gas and the initial silicon nitride powder. At the same time, the reactor 1 is heated to a predetermined temperature. Further, the hopper 8 is charged with metallic silicon powder as the nitriding feed material, which is dispersed in a non-oxidizing gas by operating the dispersion mixer 9. The non-oxidizing gas stream carrying metallic silicon powder is injected into the fluidized bed near its bottom through the supply conduit 10 whereby metallic silicon powder is continuously supplied to the fluidized bed 6 where the powder is nitrided. The nitride reaction product including silicon nitride powder plus unreacted metallic silicon powder is withdrawn from the fluidized bed 6 along with exhaust gases through the discharge conduit 11, introduced into the second reactor 1' where secondary nitriding is effected, withdrawn from the fluidized bed 6' along with exhaust gases through the discharge conduit 11', and finally delivered to the separator 13 where the silicon nitride powder is isolated from the exhaust gases and recovered in the collector 12.

The system allows the feed material, that is, metallic silicon powder carried on a non-oxidizing gas flow in the mixer means 7 to be conveyed to the fluidized bed 6. Thus metallic silicon particles are dispersed without mutual contact in the gas phase, and the particles are kept out of contact. In addition, the gas flow velocity imparts to individual particles a kinetic energy which acts to prevent fusion and agglomeration of particles. Such free metallic silicon particles are least prone to fuse and agglomerate together when the particles are introduced into the fluidized bed and exposed to high temperatures. This enables stable supply of the feed material to the bed. Furthermore, the feed material or metallic silicon powder is injected along with the gas flow into the fluidized bed 6 at its bottom through the supply conduit 10. Thus the feed material is dispersed uniformly and quickly in the fluidized bed. This feature also prevents fusion and agglomeration of metallic silicon particles. Therefore, effective nitriding reaction proceeds on metallic silicon powder in the fluidized bed to provide a reaction product or silicon nitride powder of consistent quality.

In addition, the reaction product or silicon nitride powder is taken out of the fluidized bed 6 near its top into the discharge conduit 11 while it is being dispersed and carried by the exhaust gas flow. Thus, little silicon nitride powder adheres to the inner wall of the discharge conduit, avoiding potential clogging of the conduit and ensuring that the reaction product is withdrawn and recovered efficiently. As a result, silicon nitride powder of least varying quality can be continuously produced in high rates and yields.

The reactor is not limited to the configuration of FIG. 1. Modified versions of reactor are shown in FIGS. 2 and 3. The reactor 1 of FIG. 2 is provided at the top wall with a discharge port 14 for discharging part of exhaust gases. Supply and discharge conduits 10 and 11 are vertically extended through the reactor such that the upper ends 10a and 11a of supply and discharge conduits 10 and 11 are located near the bottom and top levels of the fluidized bed 6, respectively, while the lower ends 10b and 11b of supply and discharge conduits 10 and 11 are extended outside through the bottom wall of the reactor 1. In FIG. 3, two supply conduits 10 and 10 are provided, with the remaining components being the same as in FIG. 1.

EXAMPLE

Examples of the invention are given below by way of illustration and not by way of limitation.

EXAMPLE 1

A metallic silicon powder having a particle size of less than 44 μm was kneaded with 1% by weight (calculated as solids) of polyvinyl alcohol and granulated into granules having an average particle size of 0.5 mm by means of an extrusion granulator. The granules were dried at 150° C. for water removal, placed in an oven, and fired at 1,300° C. for one hour in an argon gas stream, obtaining a nitriding feed material.

First and second reactors having an inner diameter of 80 mm and a hot zone with an axial length of 500 mm were arranged in series. Each of the first and second reactors was charged with 500 grams of silicon nitride powder while a mixture of 7 N.liter/min. of nitrogen gas and 2 N.liter/min. of hydrogen gas as the reaction gas was supplied to the reactors to form a fluidized bed having a height of 300 mm in each reactor. The first and second reactors were heated to maintain their fluidized beds at 1,250° C. and 1,400° C., respectively.

The feed material was continuously supplied to the fluidized bed in the first reactor at a rate of 200 grams/hour while the nitriding reaction product was continuously withdrawn from the first reactor so as to maintain the fluidized bed at the height of 300 mm. The reaction product was directly fed into the fluidized bed of the second reactor while the reaction product was continuously withdrawn from the second reactor so as to maintain the fluidized bed at the height of 300 mm.

The final reaction product was a silicon nitride powder of consistent quality having a nitriding degree of 95% and an α phase content of 80%. The reaction product taken out of the first reactor had a nitriding degree of 50%.

Silicon nitride powder was produced by the same procedure as in Example 1 except that the fluidized beds of the first and second reactors were maintained at 1,300° C. and 1,450° C., respectively.

The final reaction product was a silicon nitride powder of consistent quality having a nitriding degree of 98% and an α phase content of 75%. The reaction product taken out of the first reactor had a nitriding degree of 65%.

COMPARATIVE EXAMPLE

The procedure of Example 1 was repeated except that the fluidized beds of the first and second reactors were maintained at 1,420° C. and 1,450° C., respectively. After one hour from the start of feed material supply, the fluidized bed could not be maintained in the first reactor. The system was shut down and the interior of the first reactor was examined to find agglomerates of metallic silicon on the dispersing partition.

EXAMPLE 3

Silicon nitride powder was produced by the same procedure as in Example 2 except that the feed material was a mixture of the metallic silicon powder used in Example 1 and 30% by weight of a silicon nitride powder having an average particle size of 0.5 mm and it was supplied at a rate of 400 grams/hour to the fluidized bed of the first reactor.

The final reaction product was a silicon nitride powder of consistent quality having a nitriding degree of 98%.

EXAMPLE 4

Silicon nitride powder was produced by the same procedure as in Example 1 except the followings. A third reactor having an inner diameter of 80 mm and a hot zone with an axial length of 500 mm was prepared. A third fluidized bed was established in the third reactor by introducing 500 grams of silicon nitride powder and a reaction gas. The third fluidized bed was maintained at 1,450° C. while the first and second reactors were maintained at 1,300° C. and 1,350° C., respectively. The nitride product resulting from the second reactor was directly and continuously transferred to the fluidized bed of the third reactor while the nitride product was continuously withdrawn from the third reactor fluidized bed. The feed material was a mixture of the metallic silicon powder used in Example 1 and 30% by weight of a silicon nitride powder having an average particle size of 0.5 mm.

There was obtained a silicon nitride powder of consistent quality having a nitriding degree of 99%.

EXAMPLE 5

Silicon nitride powder was produced using the system shown in FIG. 1. First and second reactors 1 and 1', were columnar reactors having an inner diameter of 8 cm and a height of 100 cm. The output of the supply conduit 10 was spaced 5 cm from the dispersion partition 2 and the input of the discharge conduit 11 was spaced 35 cm from the dispersion partition 2.

A nitriding feed material was obtained by granulating a metallic silicon powder having a particle size of less than 325 mesh (44 μm) into granules having an average particle size of 0.5 mm. The hopper 8 as charged with the feed material.

The reaction chamber 3 of first reactor 1 was charged with 400 grams of silicon nitride powder while a mixture of 7 N.liter/min. of nitrogen gas and 2 N.liter/min. of hydrogen gas as the reaction gas was supplied to the reactor through the inlet port 5 to form a fluidized bed 6. The first reactor 1 was heated to maintain its fluidized bed at 1,350° C.±2° C.

Then the dispersion mixer 9 was turned on to continuously convey 200 grams/hour of the nitriding feed material carried on 2 N.liter/min of nitrogen gas through the supply conduit 10 to the fluidized bed where the feed material underwent nitriding reaction.

The nitriding reaction product was continuously withdrawn from the first reactor 1 through the discharge conduit 11 while it was being carried on exhaust gases. The nitriding reaction product was directly delivered into the fluidized bed of the second reactor 1' which was maintained at 1425° C. while the reaction product was continuously withdrawn from the second reactor and delivered to the separator 13. The silicon nitride powder separated from the exhaust gases was recovered in the collector 12.

The reaction product resulting from the first reactor contained a silicon nitride powder of consistent quality having a nitriding degree of 80% and an α phase content of 82%. The final reaction product resulting from the second reactor was a silicon nitride powder of consistent quality having a nitriding degree of 98% and an α phase content of 76%. During the system operation, supply of the feed material, withdrawal of silicon nitride powder product from the first and second reactors, and delivery to the separator 13 remained stable. After the 30-hour operation, the supply and discharge conduits 10 and 11 were examined to find no deposit.

Although some preferred embodiments have been described, many modifications and variations may be made thereto in the light of the above teachings. It is therefore to be understood that within the scope of the appended claims, the invention may be practiced otherwise than as specifically described.

We claim:
1. A method for preparing silicon nitride powder, comprising the steps of:
   1. preparing a feed material by granulating a silicon powder having a particle size of less than 44 μm to an average particle size of from 149 μm to 4 μm with a binder;
   2. heating the granulated silicon powder t a temperature of from 1100° C. to 1300° C. to sinter the particles together but not to melt the particles;
   3. continuously supplying the feed material to a first fluidized bed composed of silicon nitride powder and a non-oxidizing reaction gas containing nitrogen or ammonia gas while maintaining the bed at 1,000° to 1,400° C.;
   4. effecting a first nitriding reaction in said first fluidized bed;
   5. continuously withdrawing the nitride product from said first fluidized bed and supplying it to a second fluidized bed composed of silicon nitride powder and a non-oxidizing reaction gas containing nitrogen or ammonia gas, and
   6. effecting a second nitriding reaction in said second fluidized bed for nitriding the unreacted feed material.

2. The method of claim 1 wherein
said step of continuously supplying a feed material containing metallic silicon powder includes continuously supplying a feed material containing metallic silicon powder dispersed and carried by a non-oxidizing gas flow to the first fluidized bed at its bottom, and
said step of continuously withdrawing the nitride product from the first fluidized bed includes continuously withdrawing the silicon nitride powder product dispersed and carried by the exhaust gases from the first fluidized bed at its top.

3. The method of claim 1 wherein the second fluidized bed is maintained at a higher temperature than the first fluidized bed.

4. The method of claim 1 wherein the first bed is maintained at 1200° to 1350° C.

5. The method of claim 1 wherein said feed material is a mixture of metallic silicon powder and 5 to 50% by weight of silicon nitride powder having an average particle size of about 149 μm to 4 mm.

6. The method of claim 5 wherein the amount of silicon nitride is from 10 to 30 percent by weight.

7. The method of claim 1 wherein the binder is polyvinyl alcohol.

* * * * *